United States Patent
Caronni et al.

(10) Patent No.: US 7,336,790 B1
(45) Date of Patent: Feb. 26, 2008

(54) DECOUPLING ACCESS CONTROL FROM KEY MANAGEMENT IN A NETWORK

(75) Inventors: Germano Caronni, Palo Alto, CA (US); Amit Gupta, Fremont, CA (US); Tom R. Markson, San Mateo, CA (US); Sandeep Kumar, Santa Clara, CA (US); Christoph L. Schuba, Mountain View, CA (US); Glenn C. Scott, Mountain View, CA (US)

(73) Assignee: Sun Microsystems Inc., Menlo Park, CA (US)

( * ) Notice: Subject to any disclaimer, the term of this patent is extended or adjusted under 35 U.S.C. 154(b) by 550 days.

(21) Appl. No.: 09/458,020

(22) Filed: Dec. 10, 1999

(51) Int. Cl.
*H04L 9/32* (2006.01)
(52) U.S. Cl. ............................ 380/277; 380/33; 726/2; 726/6; 713/171
(58) Field of Classification Search ........ 713/200–201, 713/171; 709/223–225, 242, 163–164, 203, 709/219, 227, 229; 380/277–285, 115, 28–30, 380/228–229, 33; 455/3.04, 407, 450, 509, 455/515, 455; 370/230, 351; 726/1–7, 17–19, 726/14, 21–26, 30, 34
See application file for complete search history.

(56) References Cited

U.S. PATENT DOCUMENTS

| 4,825,354 A | | 4/1989 | Agrawal et al. |
|---|---|---|---|
| 5,115,466 A | * | 5/1992 | Presttun ...................... 380/257 |
| 5,144,665 A | | 9/1992 | Takaragi et al. |
| 5,220,604 A | | 6/1993 | Gasser et al. |
| 5,241,599 A | | 8/1993 | Bellovin et al. |
| 5,331,637 A | | 7/1994 | Francis et al. |
| 5,335,346 A | | 8/1994 | Fabbio |
| 5,519,833 A | | 5/1996 | Agranat et al. |

(Continued)

FOREIGN PATENT DOCUMENTS

EP       0 702 477 A2    3/1996

(Continued)

OTHER PUBLICATIONS

Pike, Rob et al., "Plan 9 from Bell Labs", 1995, Lucent Technologies, pp. 1-25.

(Continued)

*Primary Examiner*—Kim Vu
*Assistant Examiner*—Leynna T. Ha
(74) *Attorney, Agent, or Firm*—Finnegan, Henderson, Farabow, Garrett & Dunner, L.L.P.

(57) ABSTRACT

Methods and systems consistent with the present invention provide a Supernet, a private network constructed out of components from a public-network infrastructure. Supernet nodes can be located on virtually any device in the public network (e.g., the Internet), and both their communication and utilization of resources occur in a secure manner. As a result, the users of a Supernet benefit from their network infrastructure being maintained for them as part of the public-network infrastructure, while the level of security they receive is similar to that of a private network. The Supernet has an access control component and a key management component which are decoupled. The access control component implements an access control policy that determines which users are authorized to use the network, and the key management component implements the network's key management policies, which indicate when keys are generated and what encryption algorithm is used. Both access control and key management are separately configurable. Thus, the Supernet provides great flexibility by allowing different key management policies to be used with the same access control component.

19 Claims, 10 Drawing Sheets

U.S. PATENT DOCUMENTS

| | | | |
|---|---|---|---|
| 5,570,366 A | 10/1996 | Baker et al. | |
| 5,572,528 A | 11/1996 | Shuen | |
| 5,623,601 A | 4/1997 | Vu | |
| 5,636,371 A | 6/1997 | Yu | |
| 5,696,763 A | 12/1997 | Gang, Jr. | |
| 5,719,942 A | 2/1998 | Aldred et al. | |
| 5,720,035 A | 2/1998 | Allegre et al. | |
| 5,732,137 A | 3/1998 | Aziz | 380/25 |
| 5,748,736 A | 5/1998 | Mittra | |
| 5,802,320 A | 9/1998 | Baehr et al. | |
| 5,825,890 A | 10/1998 | Elgamal et al. | |
| 5,835,723 A | 11/1998 | Andrews et al. | |
| 5,856,974 A | 1/1999 | Gervais et al. | 370/392 |
| 5,884,024 A | 3/1999 | Lim et al. | 395/187.01 |
| 5,931,947 A | 8/1999 | Burns et al. | |
| 5,933,420 A | 8/1999 | Jaszewski et al. | |
| 5,960,177 A | 9/1999 | Tanno | |
| 5,987,453 A * | 11/1999 | Krishna et al. | 707/4 |
| 5,987,506 A | 11/1999 | Carter et al. | |
| 5,999,531 A | 12/1999 | Ferolito et al. | |
| 5,999,629 A * | 12/1999 | Heer et al. | 705/51 |
| 6,026,430 A * | 2/2000 | Butman et al. | 709/203 |
| 6,049,878 A * | 4/2000 | Caronni et al. | 713/201 |
| 6,055,575 A | 4/2000 | Paulsen et al. | |
| 6,061,346 A | 5/2000 | Nordman | |
| 6,061,796 A | 5/2000 | Chen et al. | |
| 6,078,586 A | 6/2000 | Dugan et al. | 370/395 |
| 6,079,020 A | 6/2000 | Liu | |
| 6,128,298 A | 10/2000 | Wootton et al. | 370/392 |
| 6,130,892 A | 10/2000 | Short et al. | 370/401 |
| 6,134,591 A * | 10/2000 | Nickles | 709/229 |
| 6,158,011 A | 12/2000 | Chen et al. | |
| 6,173,399 B1 | 1/2001 | Gilbrech | |
| 6,175,917 B1 | 1/2001 | Arrow et al. | |
| 6,188,694 B1 | 2/2001 | Fine et al. | |
| 6,212,633 B1 * | 4/2001 | Levy et al. | 713/153 |
| 6,215,877 B1 * | 4/2001 | Matsumoto | 380/277 |
| 6,219,694 B1 | 4/2001 | Lazaridis et al. | |
| 6,226,678 B1 | 5/2001 | Mattaway et al. | |
| 6,226,751 B1 | 5/2001 | Arrow et al. | |
| 6,236,652 B1 | 5/2001 | Preston et al. | 370/349 |
| 6,275,938 B1 | 8/2001 | Bond et al. | |
| 6,279,029 B1 | 8/2001 | Sampat et al. | |
| 6,286,002 B1 * | 9/2001 | Axaopoulos et al. | 707/10 |
| 6,304,973 B1 | 10/2001 | Williams | |
| 6,307,837 B1 | 10/2001 | Ichikawa et al. | 370/230 |
| 6,308,282 B1 | 10/2001 | Huang et al. | |
| 6,324,582 B1 | 11/2001 | Sridhar et al. | |
| 6,327,252 B1 | 12/2001 | Silton et al. | 370/256 |
| 6,330,671 B1 | 12/2001 | Aziz | 713/163 |
| 6,333,918 B1 | 12/2001 | Hummel | 370/238 |
| 6,335,926 B1 | 1/2002 | Silton et al. | 370/351 |
| 6,353,891 B1 | 3/2002 | Borella et al. | |
| 6,370,552 B1 | 4/2002 | Bloomfield | |
| 6,374,298 B2 | 4/2002 | Tanno | |
| 6,377,811 B1 * | 4/2002 | Sood et al. | 455/464 |
| 6,377,997 B1 | 4/2002 | Hayden | |
| 6,393,484 B1 | 5/2002 | Massarani | 709/227 |
| 6,393,485 B1 * | 5/2002 | Chao et al. | 709/200 |
| 6,415,323 B1 | 7/2002 | McCanne et al. | 709/225 |
| 6,452,925 B1 | 9/2002 | Sistanizadeh et al. | |
| 6,453,419 B1 * | 9/2002 | Flint et al. | 713/200 |
| 6,463,061 B1 | 10/2002 | Rekhter et al. | |
| 6,463,470 B1 * | 10/2002 | Mohaban et al. | 709/223 |
| 6,484,257 B1 | 11/2002 | Ellis | |
| 6,487,600 B1 | 11/2002 | Lynch | |
| 6,505,255 B1 | 1/2003 | Akatsu et al. | |
| 6,507,908 B1 | 1/2003 | Caronni | |
| 6,512,745 B1 | 1/2003 | Abe et al. | |
| 6,515,974 B1 | 2/2003 | Inoue et al. | |
| 6,532,543 B1 | 3/2003 | Smith et al. | |
| 6,557,037 B1 | 4/2003 | Provino | |
| 6,560,707 B2 * | 5/2003 | Curtis et al. | 713/163 |
| 6,567,405 B1 | 5/2003 | Borella et al. | |
| 6,577,734 B1 * | 6/2003 | Etzel et al. | 380/277 |
| 6,581,061 B2 * | 6/2003 | Graham | 707/10 |
| 6,600,733 B2 | 7/2003 | Deng | |
| 6,606,708 B1 | 8/2003 | Devine et al. | |
| 6,615,349 B1 | 9/2003 | Hair | |
| 6,631,416 B2 | 10/2003 | Bendinelli et al. | |
| 6,693,878 B1 | 2/2004 | Daruwalla et al. | |
| 6,804,777 B2 | 10/2004 | Hollis et al. | |
| 6,915,437 B2 * | 7/2005 | Swander et al. | 726/1 |
| 7,136,374 B1 | 11/2006 | Kompella | |
| 7,216,368 B2 * | 5/2007 | Ishiguro | 726/32 |

FOREIGN PATENT DOCUMENTS

| | | |
|---|---|---|
| EP | 813 327 A2 | 12/1997 |
| EP | 887 981 A2 | 12/1998 |
| WO | WO89/08887 | 9/1989 |
| WO | WO98/18269 | 10/1997 |
| WO | WO97/48210 | 12/1997 |
| WO | WO98/32301 | 1/1998 |
| WO | WO98/57464 | 12/1998 |
| WO | WO99/11019 | 3/1999 |
| WO | WO99/38081 | 7/1999 |

OTHER PUBLICATIONS

Waldvogel, Marcel et al., "The VersaKey Framework: Versatile Group Key Management", Sep. 1999, Computer Engineering and Networks Laboratory (TIK), Eth Zürich, Switzerland and Sun Microsystems Inc., Network Security Group, Palo Alto, California, pp. 1-27.

SSH IPSEC Express, White Paper, Version 2.0, Mar. 1999, SSH Communications Security Ltd., pp. 1-23.

Aziz, Ashar et al., "Simple Key-Management for Internet Protocols (SKIP)", http://www.tik.ee.ethz.ch/~skip/SKIP.html, Sep. 1999, pp. 1-19.

Aziz, Ashar et al., "Design and Implementation of SKIP", INET '95 Conference, Jun. 28, 1995, pp. 1-12.

Kent, S. et al., "IP Authentication Header", ftp://ftp.isi.edu/in-notes/rfc2402.txt, Nov. 1998, pp. 1-19.

Aziz, Ashar, "Design and Implementation of SKIP", presented at the INET 1995 Hawaii Conference, Jun. 28, 1995, under the title Simple Key Management for Internet Protocols (SKIP).

Perkins, C., "IP Mobility Support", Website: ftp://ftp.isi.edu/in-notes/rfc2002.txt, IBM Abstract, Oct. 1996, pp. 1-79.

Perkins, Charles E., "Mobile IP", IEEE Communications Magazine, May 1997, pp. 1-78.

Forman, George H., et al., "The Challenges of Mobile Computing", Mar. 9, 1994, University of Washington Computer Science & Engineering, pp. 8-9.

Amitabh et al., Proxies, Application Interfaces, and Distributed Systems, IEEE, pp. 212-220, 1992.

Cary G. Gray and David R. Cheriton, "Leases: An Efficient Fault-Tolerant Mechanism for Distributed File Cache Consistency", 1989, ACM, pp. 202-210.

H.A. Smith and J.D. McKeen, "Object-Oriented Technology: Getting Beyond the Hype", ACM, Spring 1996, vol. 27, pp. 20-29.

Wollrath et al., "Java-Centric Distributed Computing," IEEE Micro, pp. 44-53, 1997.

IBM Technical Disclosure Bulletin, "Virtual Private Networks on Vendor Independent Networks", vol. 35, No. 4A, pp, 326-329, Sep. 1992.

V-One Corp., "V-One's Smartgate VPN", No. XP-000785261, Advertisement Data Communications, pp. A5-A6, Sep. 21, 1998.

Wright, M., "Using Policies for Effective Network Management", International Journal of Network Management 9, No. XP-002116275, pp. 118-125, 1999.

Pakstas, A., "Towards Electronic Commerce Via Science Park Multi-Extranets", Computer Communicaitons 22, pp. 1351-1363, 1999.

Office Action issued in U.S. Appl. No. 09/457,914 (20 pages).

Fumio Teraoka, "VIP: a Protocol Providing Host Migration Transparency," *Internetworking: Research and Experience*, vol. 4, pp. 195-221 (1993).

Fumio Teraoka et al., "Host Migration Transparency in IP Networks: The VIP Approach," *Computer Communication Review*, pp. 45-65, Jan. 1993.

Fumio Teraoka et al., "A Network Architecture Providing Host Migration Transparency," *Computer Communication Review*, No. 4, pp. 209-220, (Sep. 1991).

Xinhua Zhao et al., "Flexible Network Support for Mobility," *ACM*, pp. 145-155, (1998).

K.C. Chua et al., "On a Linux implementation of mobile IP and its effects on TCP performance," *Computer Communicaitons Review*, No. 22, pp. 568-588, (1999).

Perkins, C., "Mobile Networking Through Mobile IP", IEEE Internet Computing, IEEE Service Center, Piscataway, New Jersey, vol. 2, No. 1, 1998, pp. 1-12.

LaBorde, D., "Understanding And Implementing Effective VPNs", Computer Technology Review, Westworld Production Company, Los Angeles, California, vol. 18, No. 2, Feb. 1, 1988, pp. 12, 14, 16.

Freier, A. et al., "The SSL Protocol, Version 3.0", Internet draft, Nov. 18, 1996, pp. 1-72 including Abstract.

Deng, R., "Integrating Security in CORBA Based Objects Architectures", Institute of Systems Science, National Univeristy of Singapore, Singapore 0511, Publication Date May 8, 1995, pp. 50-61.

Armitage, G., "IP Multicasting Over ATM Networks", IEEE Journal On Selected Areas In Communications, vol. 15, No. 3, Apr. 1997, pp. 445-457.

de Lima, Heliomar Medeiros et al., "An Effective Selective Repeat ARQ Strategy for High Speed Point-to-Multipoint Communications", IEEE, Publication Nov. 18, 1996, pp. 1059-1063.

Stevenson, D. et al., "Design of a Key Agile Cryptographic System for OC-12c Rate ATM*", IEEE Journal on Selected Areas in Communication, 1995, pp. 17-29.

Chapter 3 The Jini Model, article "The Five Key Concepts of Jini", XP-002178476, 9 pages, Jun. 1999.

"Introduction to OrbixOTM", IONA Technologies PLC, Jun. 1999, 15 pages.

"OrbixNames Programmer's and Administrator's Guide", IONA Technologies PLC, Jun. 1999, 17 pages.

"Orbix C++ Administrator's Guide" IONA Technologies PLC, Feb. 1999, 12 pages.

Chung, P. et al., DCOM and COBRA "Side by Side, Step by Step and Layer by Layer", C++ Report website http://www.sigs.com, Jan. 1998, pp. 19-29 and 40.

"DCOM Technical Overview", Microsoft Corporation, Nov. 1996, 24 pages.

McGraw, Gary et al., "Understanding the keys to Java security-the sandbox and authentication", JAVAWORLD, pp. 1-5, May 1, 1997.

R. Atkinson, "RFC 1825: Security Architecture for the Internet Protocol", Aug. 1995, pp. 1-21.

R. Atkinson, RFC 1827: IP Encapsulating Security Payload (ESP), Aug. 1995, pp. 1-12.

S. Kent et al., RF 2406: IP Encapsulating Security Payload (ESP), Nov. 1998, pp. 1-21.

S. Kent et al., "RFC 2401: Security Architecture for the Internet Protocol", Nov. 1998, pp. 1-67.

Wagner et al., A "Bump in the Stack" Encryptor for MS-DOS Systems, Feb. 22-23 1996, Proceedings of the Symposium on Network and Distributed Systems, Security, pp. 155-160.

Office Action mailed Jul. 30, 2007 in U.S. Appl. No. 09/457,916 (12 pages).

* cited by examiner

US 7,336,790 B1

DECOUPLING ACCESS CONTROL FROM KEY MANAGEMENT IN A NETWORK

RELATED APPLICATIONS

The following identified U.S. patent applications are relied upon and are incorporated by reference in this application.

U.S. patent application Ser. No. 09/458,043, issued as U.S. Pat. No. 6,970,941 on Nov. 29, 2005, and filed on the same date herewith.

U.S. patent application Ser. No. 09/457,917, issued as U.S. Pat. No. 6,798,782 on Sep. 28, 2004 and filed on the same date herewith.

U.S. patent application Ser. No. 09/457,889, issued as U.S. Pat. No. 6,977,929 on Dec. 20, 2005 and filed on the same date herewith.

U.S. patent application Ser. No. 09/457,916, entitled "SANDBOXING APPLICATIONS IN A PRIVATE NETWORK USING A PUBLIC-NETWORK INFRASTRUCTURE," and filed on the same date herewith.

U.S. patent application Ser. No. 09/457,894, abandoned, entitled "SECURE ADDRESS RESOLUTION FOR A PRIVATE NETWORK USING A PUBLIC NETWORK INFRASTRUCTURE," and filed on the same date herewith.

U.S. patent application Ser. No. 09/457,895, issued as U.S. Pat. No. 6,938,169 on Aug. 30, 2005 and filed on the same date herewith.

U.S. patent application Ser. No. 09/458,040, entitled "PRIVATE NETWORK USING A PUBLIC-NETWORK INFRASTRUCTURE," and filed on the same date herewith.

U.S. patent application Ser. No. 09/457,914, entitled "SYSTEM AND METHOD FOR ENABLING SCALABLE SECURITY IN A VIRTUAL PRIVATE NETWORK," and filed on the same date herewith.

U.S. patent application Ser. No. 09/457,915, issued as U.S. Pat. No. 6,870,842 on Mar. 22, 2005 and filed on the same date herewith.

U.S. patent application Ser. No. 09/457,896, abandoned, entitled "ANYCASTING IN A PRIVATE NETWORK USING A PUBLIC NETWORK INFRASTRUCTURE," and filed on the same date herewith.

U.S. patent application Ser. No. 09/458,021, abandoned, entitled "SCALABLE SECURITY ASSOCIATIONS FOR GROUPS FOR USE IN A PRIVATE NETWORK USING A PUBLIC-NETWORK INFRASTRUCTURE," and filed on the same date herewith.

U.S. patent application Ser. No. 09/458,044, abandoned, entitled "ENABLING SIMULTANEOUS PROVISION OF INFRASTRUCTURE SERVICES," and filed on the same date herewith.

FIELD OF THE INVENTION

The present invention relates generally to data processing systems and, more particularly, to a private network using a public-network infrastructure.

BACKGROUND OF THE INVENTION

As part of their day-to-day business, many organizations require an enterprise network, a private network with lease lines, dedicated channels, and network connectivity devices, such as routers, switches, and bridges. These components, collectively known as the network's "infrastructure," are very expensive and require a staff of information technology personnel to maintain them. This maintenance requirement is burdensome on many organizations whose main business is not related to the data processing industry (e.g., a clothing manufacturer) because they are not well suited to handle such data processing needs.

Another drawback to enterprise networks is that they are geographically restrictive. The term "geographically restrictive" refers to the requirement that if a user is not physically located such that they can plug their device directly into the enterprise network, the user cannot typically utilize it. To alleviate the problem of geographic restrictiveness, virtual private networks have been developed.

In a virtual private network (VPN), a remote device or network connected to the Internet may connect to the enterprise network through a firewall. This allows the remote device to access resources on the enterprise network even though it may not be located near any component of the enterprise network. For example, FIG. 1 depicts a VPN 100, where enterprise network 102 is connected to the Internet 104 via firewall 106. By using VPN 100, a remote device $D_1$ 108 may communicate with enterprise network 102 via Internet 104 and firewall 106. Thus, $D_1$ 108 may be plugged into an Internet portal virtually anywhere within the world and make use of the resources on enterprise network 102.

To perform this functionality, $D_1$ 108 utilizes a technique known as tunneling to ensure that the communication between itself and enterprise network 102 is secure in that it cannot be viewed by an interloper. "Tunneling" refers to encapsulating one packet inside another when packets are transferred between end points (e.g., $D_1$ 108 and VPN software 109 running on firewall 106). The packets may be encrypted at their origin and decrypted at their destination. For example, FIG. 2A depicts a packet 200 with a source Internet protocol (IP) address 202, a destination IP address 204, and data 206. It should be appreciated that packet 200 contains other information not depicted, such as the source and destination port. As shown in FIG. 2B, the tunneling technique forms a new packet 208 out of packet 200 by encrypting it and adding both a new source IP address 210 and a new destination IP address 212. In this manner, the contents of the original packet (i.e., 202, 204, and 206) are not visible to any entity other than the destination. Referring back to FIG. 1, by using tunneling, remote device $D_1$ 108 may communicate and utilize the resources of the enterprise network 102 in a secure manner.

Although VPNs alleviate the problem of geographic restrictiveness, they impose significant processing overhead when two remote devices communicate. For example, if remote device $D_1$ 108 wants to communicate with remote device $D_2$ 110, $D_1$ sends a packet using tunneling to VPN software 109, where the packet is decrypted and then transferred to the enterprise network 102. Then, the enterprise network 102 sends the packet to VPN software 109, where it is encrypted again and transferred to $D_2$. Given this processing overhead, it is inefficient for two remote devices to communicate in a VPN environment. It is therefore desirable to alleviate the need of organizations to maintain their own network infrastructure as well as to improve communication between remote devices.

SUMMARY OF THE INVENTION

Methods and systems consistent with the present invention provide a private network that uses components from a public-network infrastructure. Nodes of the private network can be located on virtually any device in the public network (e.g., the Internet), and both their communication and utilization of resources occur in a secure manner. As a result, the users of this private network benefit from their network infrastructure being maintained for them as part of the public-network infrastructure, while the level of security they receive is similar to or even stronger than that provided by conventional private networks. Additionally, the nodes of the private network are not geographically restricted in that they can be connected to the private network from virtually any portal to the Internet in the world.

This private network has an access control component and a key management component which are decoupled. The access control component implements an access control policy that authenticates users and determines which users are authorized to join the network, and the key management component implements the network's key management policies, which indicate when keys are generated and what encryption algorithm is used. Both access control and key management are separately configurable. Thus, the private network provides great flexibility by allowing different key management policies to be used with the same access control policy.

In accordance with an implementation consistent with the present invention, devices are connected to a distributed system comprising a network with a plurality of nodes. A first of the devices comprises a memory with an access control program that authenticates a new node and performs admission control, which is decoupled from a key management program that implements a key management policy for maintaining keys used by the nodes for communicating in a secure manner. The first of the devices also has a processor that runs the access control program and the key management program. A second device comprises a memory with a new node that uses the access control program to join the network and receives a key from the key management program in accordance with the key management policy. The second device also has a processor that runs the new node.

In another implementation, a method is provided in a data processing system connected to a network having nodes. The network has an access control program and a key management program that is decoupled from the access control program. The access control program receives a request from a new node to join the network, authenticates the new node, and performs admission control using an admission policy. The key management program generates a key in accordance with a key management policy and sends the key to the new node upon successful authentication of the new node. The key is for use by the new node in communicating with the nodes in a secure manner.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Methods and systems consistent with the present invention provide a "Supernet," which is a private network that uses components from a public-network infrastructure. A Supernet allows an organization to utilize a public-network infrastructure for its enterprise network so that the organization no longer has to maintain a private network infrastructure; instead, the organization may have the infrastructure maintained for them by one or more service providers or other organizations that specialize in such connectivity matters. As such, the burden of maintaining an enterprise network is greatly reduced. Moreover, a Supernet is not geographically restrictive, so a user may plug their device into the Internet from virtually any portal in the world and still be able to use the resources of their private network in a secure and robust manner.

The Supernet has an access control component and a key management component which are decoupled. The access control component authenticates a user by verifying the identity of the user, and uses an admission policy to determine whether the user will be admitted to the network. The key management component implements the network's key management policies, which indicate when keys are generated and what encryption algorithm is used. Both access control and key management are separately configurable. Thus, the Supernet provides great flexibility by allowing different key management policies to be used with the same access control component.

Overview

Figure 1:
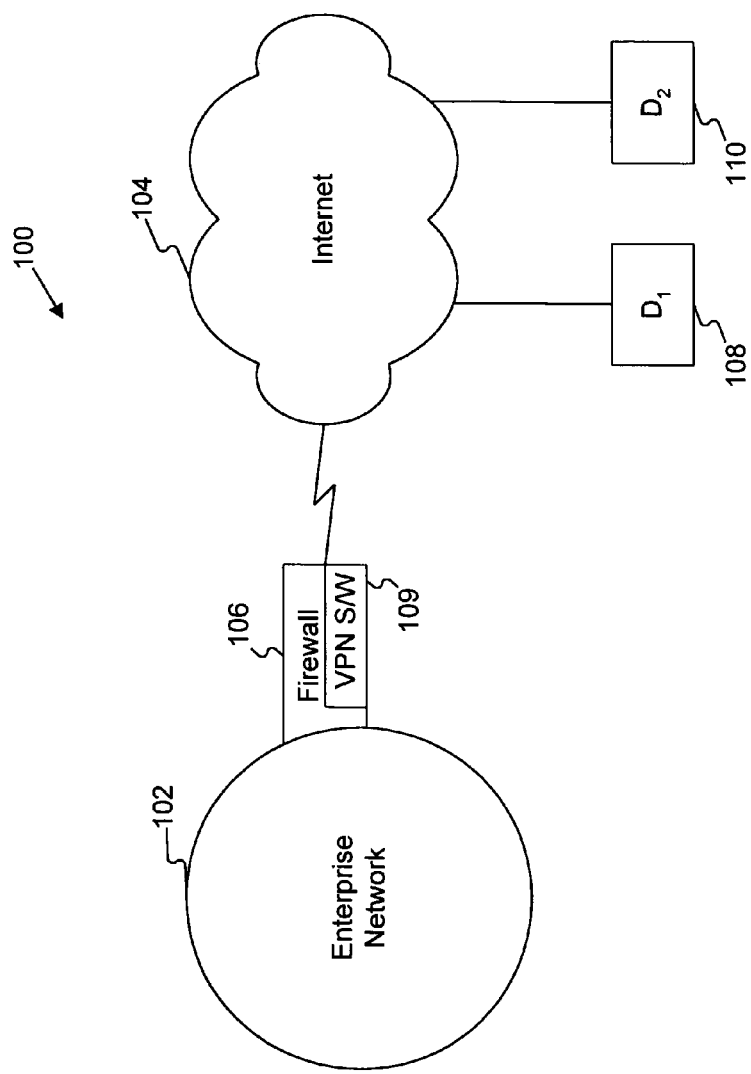
FIG. 1 depicts a conventional virtual private network (VPN) system.
Figure 2A:
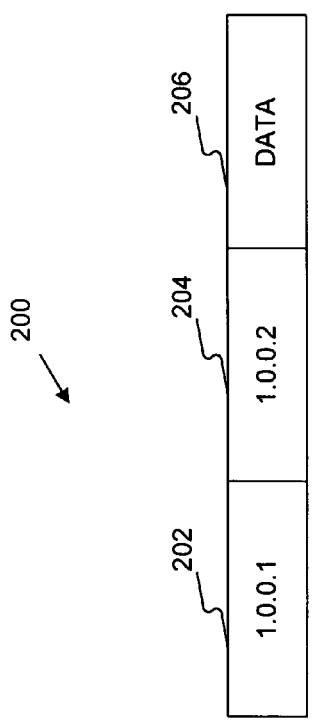
FIG. 2A depicts a conventional network packet.
Figure 2B:
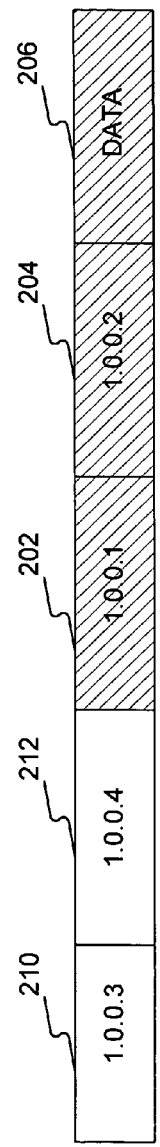
FIG. 2B depicts the packet of FIG. 2A after it has been encrypted in accordance with a conventional tunneling technique.
Figure 3:
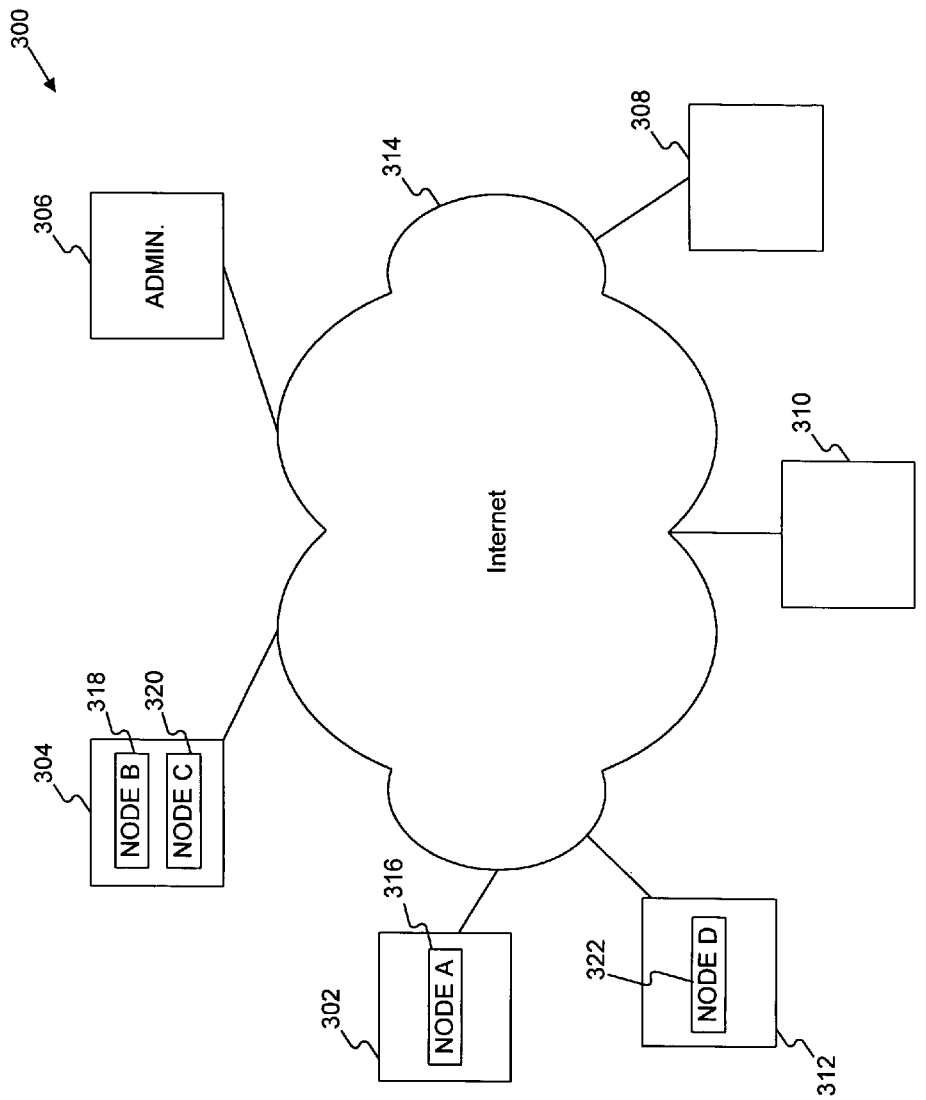
FIG. 3 depicts a data processing system suitable for use with methods and systems consistent with the present invention.

FIG. 3 depicts a data processing system 300 suitable for use with methods and systems consistent with the present invention. Data processing system 300 comprises a number of devices, such as computers 302-312, connected to a public network, such as the Internet 314. A Supernet's infrastructure uses components from the Internet because devices 302, 304, and 312 contain nodes that together form a Supernet and that communicate by using the infrastructure of the Internet. These nodes 316, 318, 320, and 322 are communicative entities (e.g., processes) running within a particular device and are able to communicate among themselves as well as access the resources of the Supernet in a secure manner. When communicating among themselves, the nodes 316, 318, 320, and 322 serve as end points for the communications, and no other processes or devices that are not part of the Supernet are able to communicate with the Supernet's nodes or utilize the Supernet's resources. The Supernet also includes an administrative node 306 to administer to the needs of the Supernet.

It should be noted that since the nodes of the Supernet rely on the Internet for connectivity, if the device on which a node is running relocates to another geographic location, the device can be plugged into an Internet portal and the node running on that device can quickly resume the use of the resources of the Supernet. It should also be noted that since a Supernet is layered on top of an existing network, it operates independently of the transport layer. Thus, the nodes of a Supernet may communicate over different transports, such as IP, IPX, X.25, or ATM, as well as different physical layers, such as RF communication, cellular communication, satellite links, or land-based links.

Figure 4:
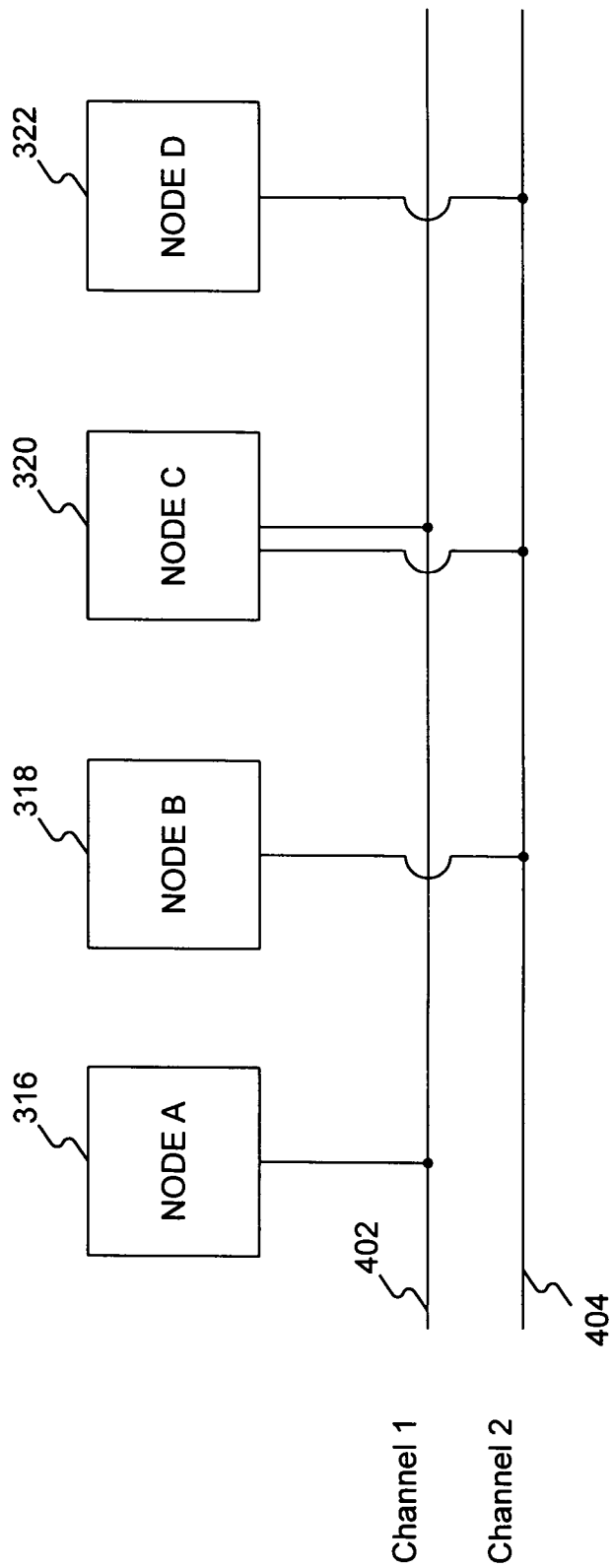
FIG. 4 depicts the nodes depicted in FIG. 3 communicating over multiple channels.

As shown in FIG. 4, a Supernet includes a number of channels that its nodes 316-322 can communicate over. A "channel" refers to a collection of virtual links through the public-network infrastructure that connect the nodes on the channel such that only these nodes can communicate over it. A node on a channel may send a message to another node on that channel, known as a unicast message, or it can send a message to all other nodes on that channel, known as a multicast message. For example, channel 1 402 connects node A 316 and node C 320, and channel 2 404 connects node B 318, node C 320, and node D 322. Each Supernet has any number of preconfigured channels over which the nodes on that channel can communicate. In an alternative embodiment, the channels are dynamically defined.

In addition to communication, the channels may be used to share resources. For example, channel 1 402 may be configured to share a file system as part of node C 320 such that node A 316 can utilize the file system of node C in a secure manner. In this case, node C 320 serves as a file system manager by receiving file system requests (e.g., open, close, read, write, etc.) and by satisfying the requests by manipulating a portion of the secondary storage on its local machine. To maintain security, node C 320 stores the data in an encrypted form so that it is unreadable by others. Such security is important because the secondary storage may not be under the control of the owners of the Supernet, but may instead be leased from a service provider. Additionally, channel 2 404 may be configured to share the computing resources of node D 322 such that nodes B 318 and C 320 send code to node D for execution. By using channels in this manner, resources on a public network can be shared in a secure manner.

A Supernet provides a number of features to ensure secure and robust communication among its nodes. First, the system provides authentication and admission control so that nodes become members of the Supernet under strict control to prevent unauthorized access. Second, the Supernet provides communication security services so that the sender of a message is authenticated and communication between end points occurs in a secure manner by using encryption. Third, the system provides key management to reduce the possibility of an intruder obtaining an encryption key and penetrating a secure communication session. The system does so by providing one key per channel and by changing the key for a channel whenever a node joins or leaves the channel. Alternatively, the system may use a different security policy.

Fourth, the system provides address translation in a transparent manner. Since the Supernet is a private network constructed from the infrastructure of another network, the Supernet has its own internal addressing scheme, separate from the addressing scheme of the underlying public network. Thus, when a packet from a Supernet node is sent to another Supernet node, it travels through the public network. To do so, the Supernet performs address translation from the internal addressing scheme to the public addressing scheme and vice versa. To reduce the complexity of Supernet nodes, system-level components of the Supernet perform this translation on behalf of the individual nodes so that it is transparent to the nodes. Another benefit of the Supernet's addressing is that it uses an IP-based internal addressing scheme so that preexisting programs require little modification to run within a Supernet.

Fifth, the Supernet provides operating system-level enforcement of node compartmentalization in that an operating system-level component treats a Supernet node running on a device differently than it treats other processes on that device. This component (i.e., a security layer in a protocol stack) recognizes that a Supernet node is part of a Supernet, and therefore, it enforces that all communications to and from this node travel through the security infrastructure of the Supernet such that this node can only communicate with other members of the same channel in the Supernet and that non-members of the channel cannot access this node. Additionally, this operating system-level enforcement of node compartmentalization allows more than one Supernet node to run on the same machine, regardless of whether the nodes are from the same Supernet, and allows nodes of other networks to run on the same machine as a Supernet node.

Finally, the Supernet provides flexibility in its configuration by decoupling access control from key management. Thus, the network administrator may choose an access control policy for the entire Supernet and may choose a key management policy for each of the Supernet's channels. The access control policy includes the authentication mechanism to use when verifying the identity of a user, and the admission policy, which provides a set of criteria (e.g., such as a user's location, time of day for joining, the user's employment status, etc.) that must be met before the user can join the network. The key management policy indicates when keys are generated and what encryption algorithm to use. Although the access control policy is described as being applied to a user, one skilled in the art will appreciate that it can also be performed on a per-node basis.

By being able to separately select each policy, both the access control policy and the key management policy are separately configurable, providing the network administrator with great flexibility to configure the network in an efficient manner. This separation of access control from key management also makes it possible to provide two layers of security to the nodes in a Supernet. To join a Supernet, a node first gains access from the administrative unit and then obtains a key to allow communication on a specific channel.

Implementation Details

Figure 5:
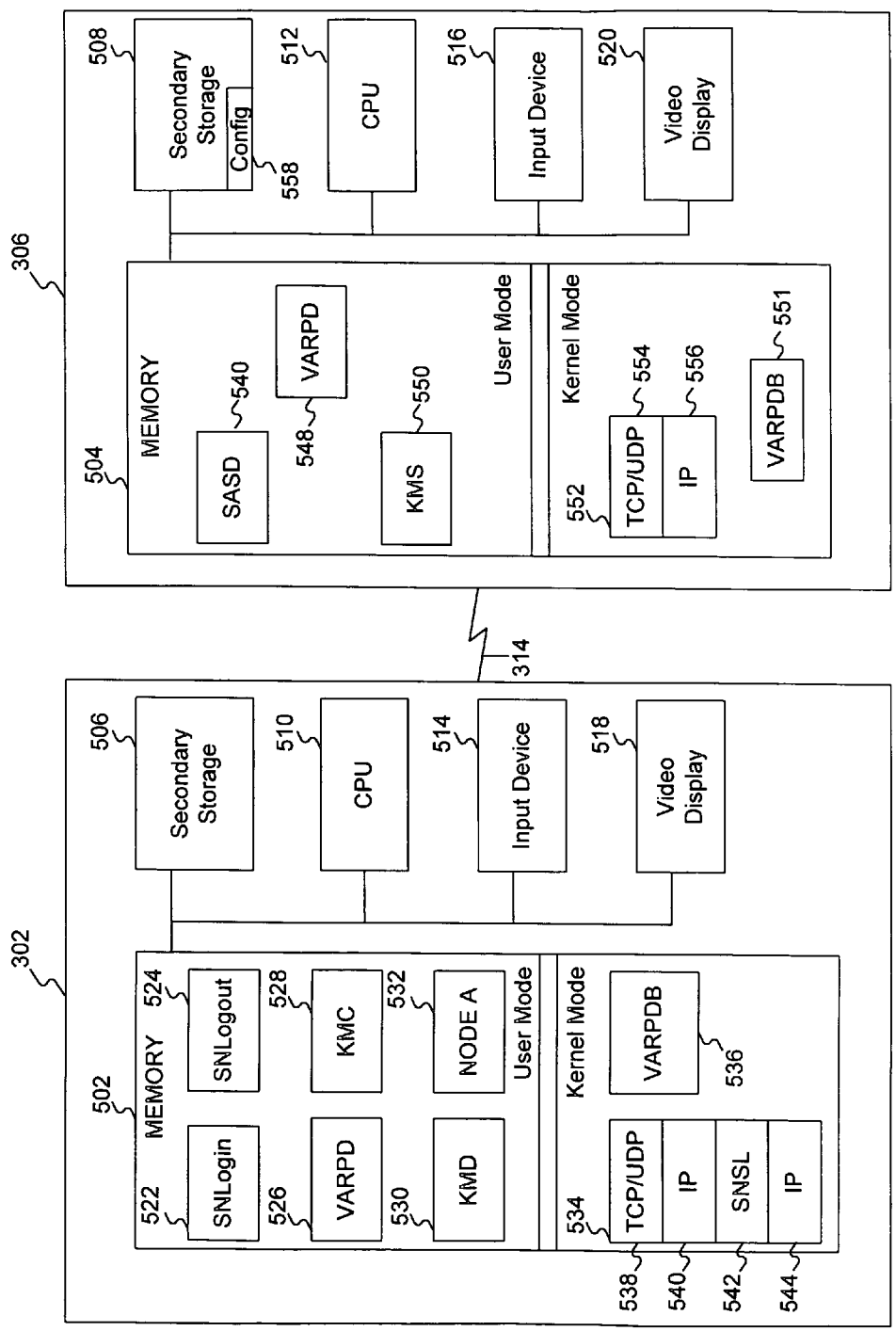
FIG. 5 depicts two devices depicted in FIG. 3 in greater detail.

FIG. 5 depicts administrative machine 306 and device 302 in greater detail, although the other devices 304 and 308-312 may contain similar components. Device 302 and administrative machine 306 communicate via Internet 314. Each device contains similar components, including a memory 502, 504; secondary storage 506, 508; a central processing unit (CPU) 510, 512; an input device 514, 516; and a video display 518, 520. One skilled in the art will appreciate that these devices may contain additional or different components.

Memory 504 of administrative machine 306 includes the SASD process 540, VARPD 548, and KMS 550 all running in user mode. That is, CPU 512 is capable of running in at least two modes: user mode and kernel mode. When CPU 512 executes programs running in user mode, it prevents them from directly manipulating the hardware components, such as video display 518. On the other hand, when CPU 512 executes programs running in kernel mode, it allows them to manipulate the hardware components. Memory 504 also contains a VARPDB 551 and a TCP/IP protocol stack 552 that are executed by CPU 512 running in kernel mode. TCP/IP protocol stack 552 contains a TCP/UDP layer 554 and an IP layer 556, both of which are standard layers well known to those of ordinary skill in the art. Secondary storage 508 contains a configuration file 558 that stores various configuration-related information (described below) for use by SASD 540.

SASD 540 represents a Supernet: there is one instance of an SASD per Supernet, and it both authenticates nodes and authorizes nodes to join the Supernet. VARPD 548 has an associated component, VARPDB 551, into which it stores mappings of the internal Supernet addresses, known as a node IDs, to the network addresses recognized by the public-network infrastructure, known as the real addresses. The "node ID" may include the following: a Supernet ID (e.g., 0x123), reflecting a unique identifier of the Supernet, and a virtual address, comprising an IP address (e.g., 10.0.0.1). The "real address" is an IP address (e.g., 10.0.0.2) that is globally unique and meaningful to the public-network infrastructure. In a Supernet, one VARPD runs on each machine, and it may play two roles. First, a VARPD may act as a server by storing all address mappings for a particular Supernet into its associated VARPDB. Second, regardless of its role as a server or not, each VARPD assists in address translation for the nodes on its machine. In this role, the VARPD stores into its associated VARPDB the address mappings for its nodes, and if it needs a mapping that it does not have, it will contact the VARPD that acts as the server for the given Supernet to obtain it.

KMS 550 performs key management for a channel. For example, KMS 550 might generate a new key every time a node joins a channel and generate a new key every time a node leaves a channel. There is one KMS per channel in a Supernet.

To configure a Supernet, a system administrator creates a configuration file 558 that is used by SASD 540 when starting or reconfiguring a Supernet. This file may specify: (1) the Supernet name, (2) all of the channels in the Supernet, (3) the nodes that communicate over each channel, (4) the address of the KMS for each channel, (5) the address of the VARPD that acts as the server for the Supernet, (6) the user IDs of the users who are authorized to create Supernet nodes, (7) the authentication mechanism to use for each user, (8) the admission control policy for each channel, and (9) the key management policy of each channel. Although the configuration information is described as being stored in a configuration file, one skilled in the art will appreciate that this information may be retrieved from other sources, such as databases or interactive configurations.

After the configuration file is created, it is used to start a Supernet. For example, when starting a Supernet, the system administrator first starts SASD, which reads the configuration information stored in the configuration file. As part of this processing, the SASD identifies the authentication mechanism to use for each user and stores an indication of this mechanism for later use when authenticating each user. Also at startup, the administrator starts one KMS per channel, and each KMS reads the configuration file to identify the key management policy to use for its channel. Each KMS can implement a different key management policy from the available policies listed in the configuration file, which may include any of a number of well-known key management polices, such as Group Key Management Protocol, Versakey, Key Pre-distribution, Secure Lock, and Iolus. After this processing has completed, the Supernet is ready for nodes to join it.

Memory 502 of device 302 contains SNlogin script 522, SNlogout script 524, VARPD 526, KMC 528, KMD 530, and node A 522, all running in user mode. Memory 502 also includes TCP/IP protocol stack 534 and VARPDB 536 running in kernel mode.

SNlogin 522 is a script used for logging into a Supernet. Successfully executing this script results in a Unix shell from which programs (e.g., node A 522) can be started to run within the Supernet context, such that address translation and security encapsulation is performed transparently for them and all they can typically access is other nodes on the Supernet. Alternatively, a parameter may be passed into SNlogin 522 that indicates a particular process to be automatically run in a Supernet context. Once a program is running in a Supernet context, all programs spawned by that program also run in the Supernet context, unless explicitly stated otherwise. SNlogout 524 is a script used for logging out of a Supernet. Although both SNlogin 522 and SNlogout 524 are described as being scripts, one skilled in the art will appreciate that their processing may be performed by another form of software. VARPD 526 performs address translation between node IDs and real addresses. KMC 528 is the key management component for each node that receives updates if the key for a channel ("the channel key") changes. There is one KMC per node per channel. KMD 530 receives requests from SNSL 542 of the TCP/IP protocol stack 534 when a packet is received and accesses the appropriate KMC for the destination node to retrieve the appropriate key to decrypt the packet. Node A 532 is a Supernet node running in a Supernet context.

TCP/IP protocol stack 534 contains a standard TCP/UDP layer 538, two standard IP layers (an inner IP layer 540 and an outer IP layer 544), and a Supernet security layer (SNSL) 542, acting as the conduit for all Supernet communications. To conserve memory, both inner IP layer 540 and outer IP layer 544 may share the same instance of the code of an IP layer. SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key. Two IP layers 540, 544 are used in the TCP/IP protocol stack 534 because both the internal addressing scheme and the external addressing scheme are IP-based. Thus, for example, when a packet is sent, inner IP layer 540 receives the packet from TCP/UDP layer 538 and processes the packet with its node ID address before passing it to the SNSL layer 542, which encrypts it, prepends the real source IP address and the real destination IP address, and then passes the encrypted packet to outer IP layer 544 for sending to the destination.

SNSL 542 utilizes VARPDB 536 to perform address translation. VARPDB stores all of the address mappings encountered thus far by SNSL 542. If SNSL 542 requests a mapping that VARPDB 536 does not have, VARPDB communicates with the VARPD 526 on the local machine to obtain the mapping. VARPD 526 will then contact the VARPD that acts as the server for this particular Supernet to obtain it.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although a number of the software components are described as being located on the same machine, one skilled in the art will appreciate that these components may be distributed over a number of machines.

Figure 6A:
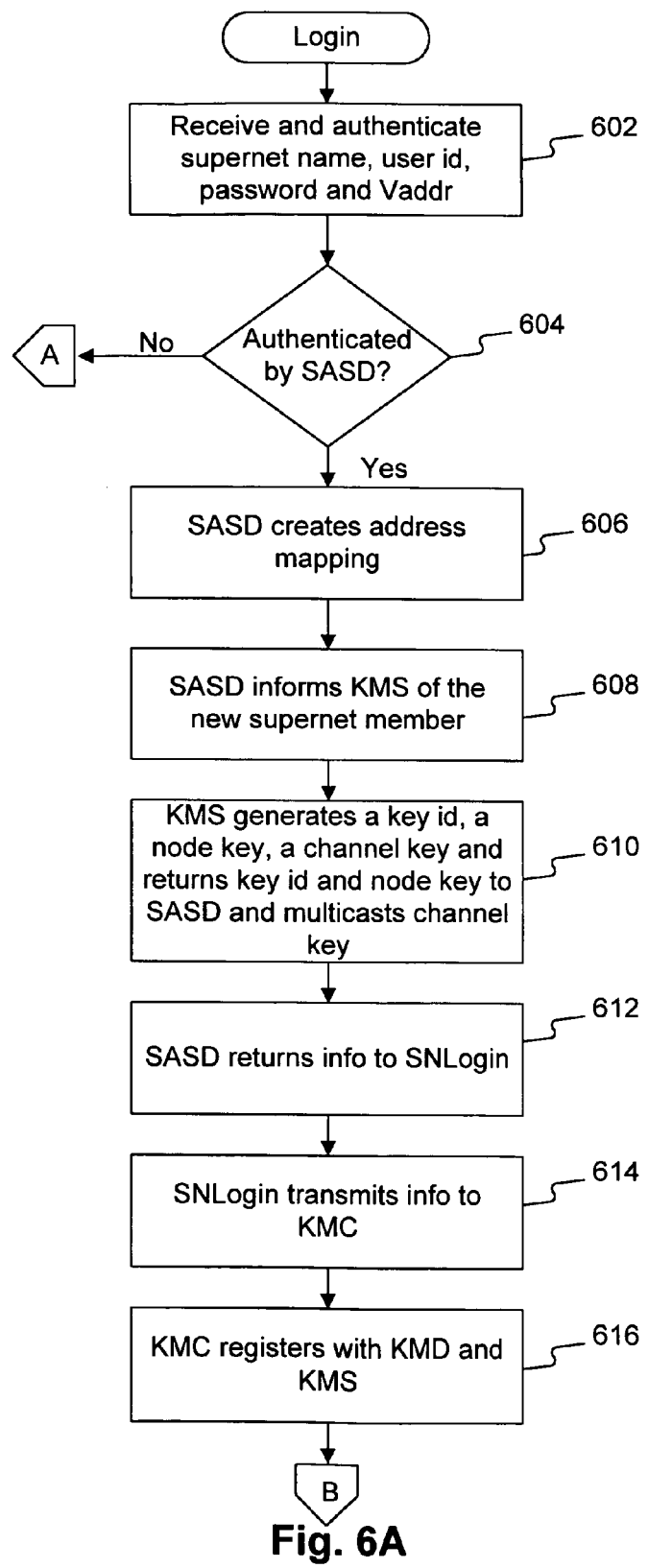
FIGS. 6A and 6B depict a flow chart of the steps performed when a node joins a VPN in a manner consistent with the present invention.
Figure 6B:
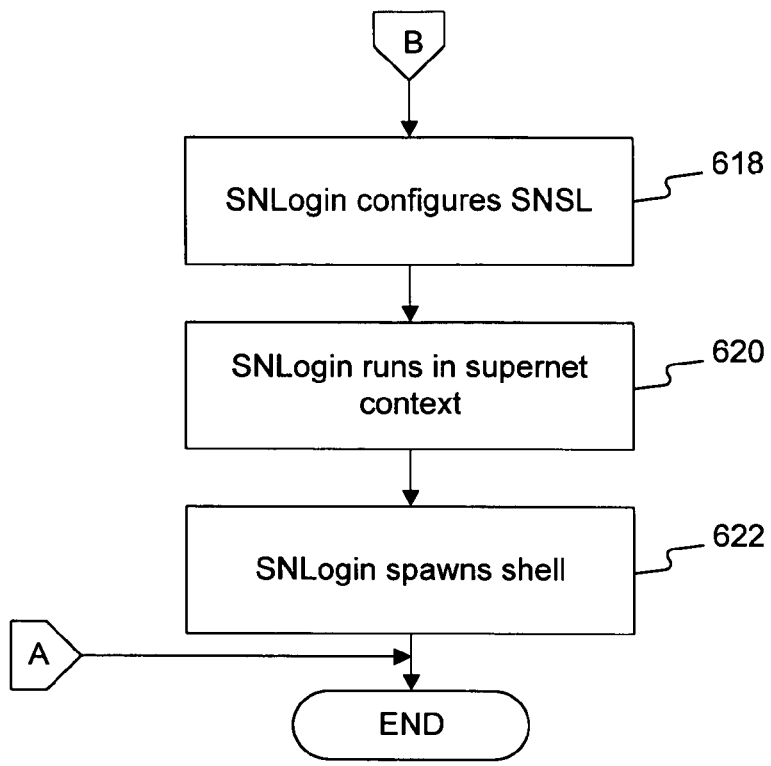

FIGS. 6A and 6B depict a flow chart of the steps performed when a node joins a Supernet. The first step performed is that the user invokes the SNlogin script and enters the Supernet name, their user ID, their password, and a requested virtual address (step 602). Of course, this information depends on the particular authentication mechanism used. Upon receiving this information, the SNlogin script performs a handshaking with SASD to authenticate this information using the appropriate authentication mechanism. In this step, the user may request a particular virtual address to be used, or alternatively, the SASD may select one for them. In accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

Next, if any of the information in step 602 is not validated by SASD (step 604), processing ends. Otherwise, upon successful authentication, SASD creates an address mapping between a node ID and the real address (step 606). In this step, SASD concatenates the Supernet ID with the virtual address to create the node ID, obtains the real address of the SNlogin script by querying network services in a well-known manner, and then registers this information with the VARPD that acts as the server for this Supernet. This VARPD is identified in the configuration file.

After creating the address mapping, SASD informs the KMS that there is a new Supernet member that has been authenticated and admitted (step 608). In this step, SASD sends the node ID and the real address to the KMS. The KMS reads the configuration file and implements the key management policy specified for the channel to which the new node will belong. The key management policy dictates (1) when keys are generated and distributed, and (2) what encryption algorithm is used. A key management policy can be static, with an unchanging group key distributed to members as they join the network, or dynamic, where the group key changes as members join or leave the network.

In one implementation of the present invention, using the Versakey protocol, the KMS generates a key for use in communicating between the new node's KMC and the KMS ("a node key"), and automatically updates the channel key for use in encrypting traffic on this particular channel (step 610). Then, KMS multicasts this channel key to all KMCs on the channel as a new key because a node has just been added to the channel. Alternatively, under the Group Key Management Protocol, the channel key does not change when a new node joins the channel.

SASD receives the key ID and the node key from KMS and returns it to SNlogin (step 612). After receiving the key ID and the node key from SASD, SNlogin starts a KMC for this node and transmits to the KMC the node ID, the key ID, the node key, the address of the VARPD that acts as the server for this Supernet, and the address of KMS (step 614). The KMC then registers with the KMD indicating the node it is associated with, and KMC registers with KMS for key updates (step 616). When registering with KMS, KMC provides its address so that it can receive updates to the channel key via the Versakey protocol. The Versakey protocol is described in greater detail in IEEE Journal on Selected Areas in Communication, Vol. 17, No. 9, 1999, pp. 1614-1631. After registration, the KMC will receive key updates whenever a channel key changes on one of the channels that the node communicates over.

Next, SNlogin configures SNSL (step 618 in FIG. 6B). In this step, SNlogin indicates which encryption algorithm to use for this channel and which authentication algorithm to use, both of which are received from the configuration file via SASD. SNSL stores this information in an access control list. In accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

After configuring SNSL, SNlogin invokes an operating system call, SETVIN, to cause the SNlogin script to run in a Supernet context (step 620). In Unix, each process has a data structure known as the "proc structure" that contains the process ID as well as a pointer to a virtual memory description of this process. In accordance with methods and systems consistent with the present invention, the channel IDs indicating the channels over which the process communicates as well as its virtual address for this process are added to this structure. By associating this information with the process, the operating system and the SNSL layer can enforce that this process runs in a Supernet context. Although methods and systems consistent with the present invention are described as operating in a Unix environment, one skilled in the art will appreciate that such methods and systems can operate in other environments. After the SNlogin script runs in the Supernet context, the SNlogin script spawns a Unix program, such as a Unix shell, or a service daemon (step 622). In this step, the SNlogin script spawns a Unix shell from which programs can be run by the user. All of these programs will thus run in the Supernet context until the user runs the SNlogout script.

Figure 7:
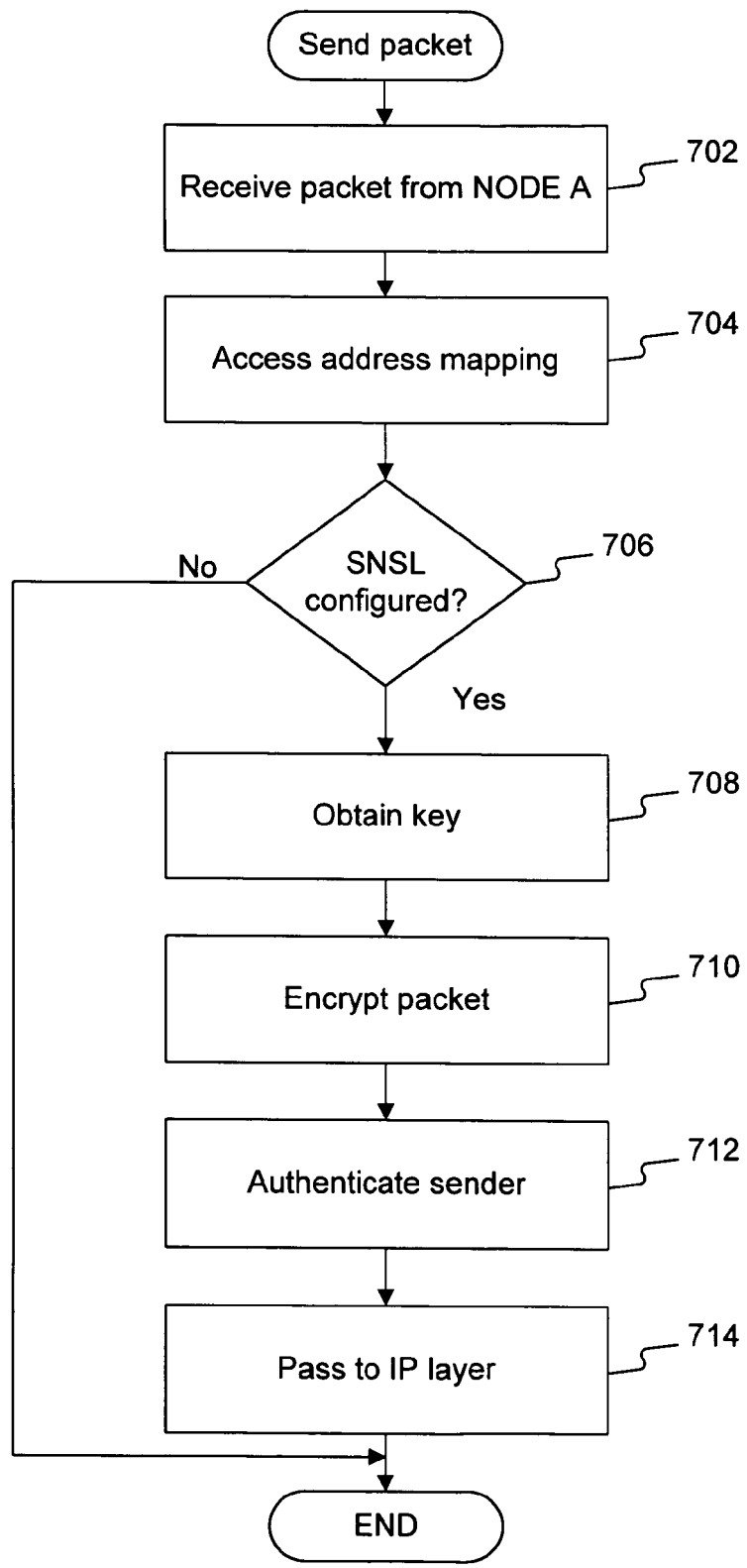
FIG. 7 depicts a flow chart of the steps performed when sending a packet from a node of the VPN in a manner consistent with the present invention.

FIG. 7 depicts a flow chart of the steps performed when sending a packet from node A. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed is for the SNSL layer to receive a packet originating from node A via the TCP/UDP layer and the inner IP layer (step 702). The packet contains a source node ID, a destination node ID, and data. The SNSL layer then accesses the VARPDB to obtain the address mapping between the source node ID and the source real address as well as the destination node ID and the destination real address (step 704). If they are not contained in the VARPDB because this is the first time a packet has been sent from this node or sent to this destination, the VARPDB accesses the local VARPD to obtain the mapping. When contacted, the VARPD on the local machine contacts the VARPD that acts as the server for the Supernet to obtain the appropriate address mapping.

After obtaining the address mapping, the SNSL layer determines whether it has been configured to communicate over the appropriate channel for this packet (step 706). This configuration occurs when SNlogin runs, and if the SNSL has not been so configured, processing ends. Otherwise, SNSL obtains the channel key to be used for this channel (step 708). The SNSL maintains a local cache of keys and an indication of the channel to which each key is associated.

Each channel key is time stamped to expire in ten seconds, although this time is configurable by the administrator. If there is a key located in the cache for this channel, SNSL obtains the key. Otherwise, SNSL accesses KMD which then locates the appropriate channel key from the appropriate KMC. After obtaining the key, the SNSL layer encrypts the packet using the appropriate encryption algorithm and the key previously obtained (step 710). When encrypting the packet, the source node ID, the destination node ID, and the data may be encrypted, but the source and destination real addresses are not, so that the real addresses can be used by the public network infrastructure to send the packet to its destination.

In addition to encrypting the packet, the SNSL layer adds authentication information to the packet header to enable the destination to verify that the packet was sent by the bona fide sender and that the packet was not modified in transit (step 712). In this step, the SNSL layer uses the MD5 authentication protocol, although one skilled in the art will appreciate that other authentication protocols may be used. Next, the SNSL layer passes the packet to the IP layer where it is then sent to the destination node in accordance with known techniques associated with the IP protocol (step 714).

Figure 8:
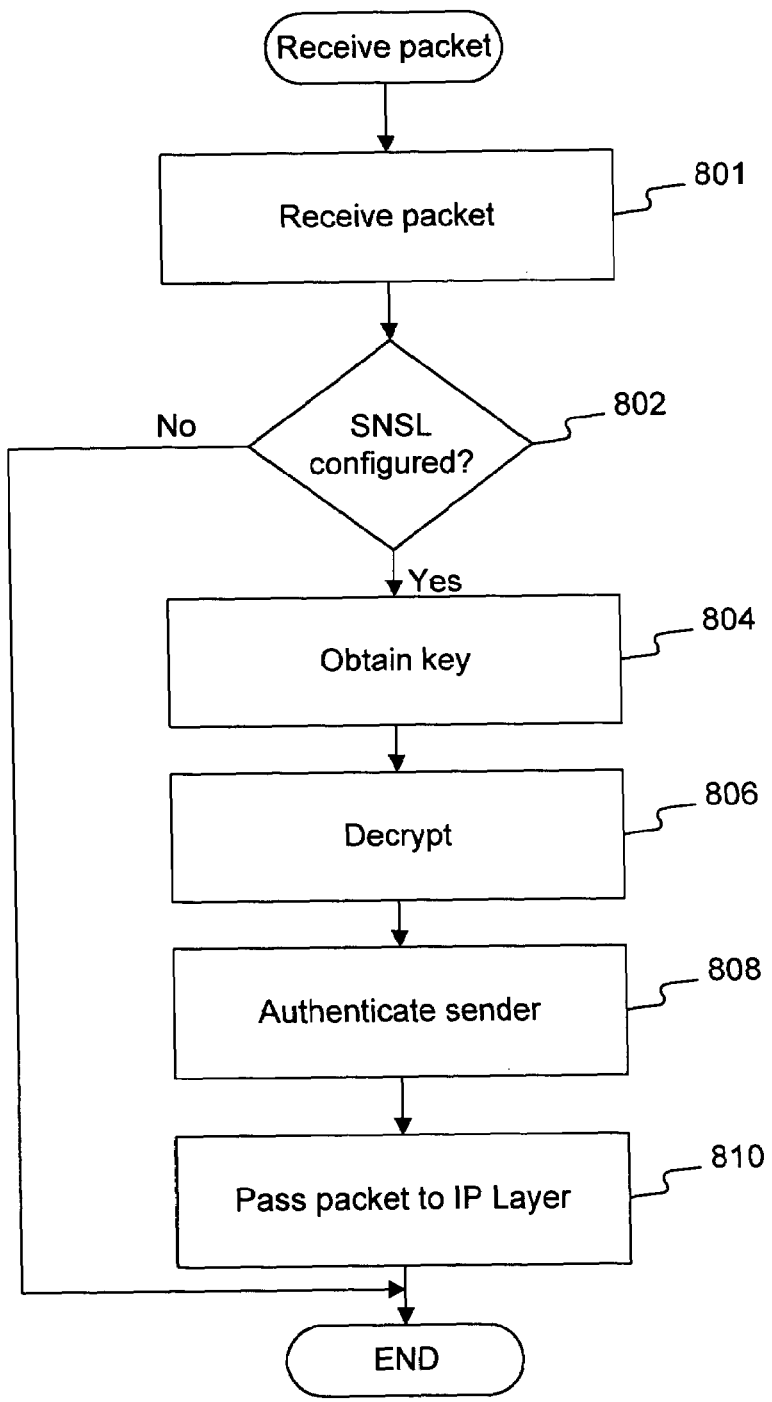
FIG. 8 depicts a flow chart of the steps performed when receiving a packet by a node of the VPN in a manner consistent with the present invention.

FIG. 8 depicts a flow chart of the steps performed by the SNSL layer when it receives a packet. Although the steps of the flow chart are described in a particular order, one skilled in the art will appreciate that these steps may be performed in a different order. Additionally, although the SNSL layer is described as performing authentication, encryption and decryption, this processing is policy driven such that one, two, all, or none of authentication, encryption, and decryption may be performed. The first step performed by the SNSL layer is to receive a packet from the network (step 801). This packet contains a real source address and a real destination address that are not encrypted as well as a source node ID, a destination node ID, and data that are encrypted. Then, it determines whether it has been configured to communicate on this channel to the destination node (step 802). If SNSL has not been so configured, processing ends. Otherwise, the SNSL layer obtains the appropriate key as previously described (step 804). It then decrypts the packet using this key and the appropriate encryption algorithm (step 806). After decrypting the packet, the SNSL layer authenticates the sender and validates the integrity of the packet (step 808), and then it passes the packet to the inner IP layer for delivery to the appropriate node (step 810). Upon receiving the packet, the inner IP layer uses the destination node ID to deliver the packet.

Figure 9:
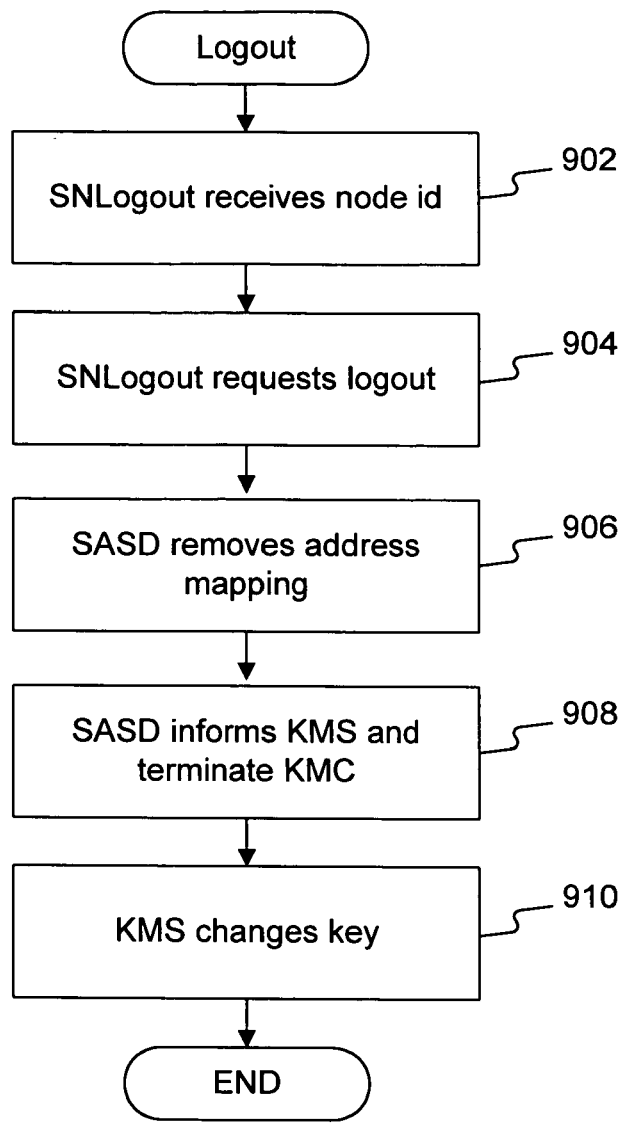
FIG. 9 depicts a flow chart of the steps performed when logging out of a VPN in a manner consistent with the present invention.

FIG. 9 depicts a flow chart of the steps performed when logging a node out of a Supernet. The first step performed is for the user to run the SNlogout script and to enter a node ID (step 902). Next, the SNlogout script requests a log out from SASD (step 904). Upon receiving this request, SASD removes the mapping for this node from the VARPD that acts as the server for the Supernet (step 906). SASD then informs KMS to cancel the registration of the node, and KMS terminates this KMC (step 908). If a dynamic key management policy is indicated in the configuration file, KMS generates a new channel key for the channels on which the node was communicating (step 910) to provide greater security.

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. A distributed system comprising a network with a plurality of channels having nodes on devices, the system further comprising:
   an access control program that authenticates a new node and performs admission control for all of the nodes on the network;
   for each of the plurality of channels, a key management program unique to the channel that implements a key management policy for maintaining keys used by the nodes on the channel for communicating in a secure manner, each key management program being decoupled from the access control program; and
   processors for running the access control program and the plurality of key management programs.

2. The distributed system of claim 1 further including
   the new node that uses the access control program to join the network and that receives from the key management program for a channel corresponding to the new node in accordance with the key management policy of the channel a key for sending communications to the nodes on the channel in a secure manner; and
   a processor for running the new node.

3. The distributed system of claim 1 wherein the access control program and the key management programs are separately configurable.

4. The distributed system of claim 1 wherein the access control program authenticates the new node by authenticating an initiator that initiates the joining of the new node to the network.

5. The distributed system of claim 4, wherein the initiator is a user.

6. The distributed system of claim 1 wherein the network is a private network running on a public network infrastructure.

7. A method in a data processing system connected to a network with a plurality of channels having nodes, the data processing system having an access control program, a unique key management program for each of the plurality of channels, and a new node, the method comprising the steps of:
   under the control of the new node,
      sending a request to the access control program for the new node to join the network, the sending initiated by a user;
   under the control of the access control program,
      receiving the request for the new node to join the network;
      authenticating the new node;
      accessing an admission policy for the user, the admission policy indicating admission criteria;
      determining whether the user satisfies the admission criteria; and
      when the new node has been authenticated successfully and the user satisfies the admission criteria, sending an indication to the key management program for a channel corresponding to the new node that the new node has joined the network;
   under the control of the key management program for the channel corresponding to the new node,
      receiving the indication;
      accessing a predefined key management policy for the channel corresponding to the new node;
      generating a key for use in communicating in a secure manner over the channel in accordance with the predefined key management policy; and
      sending the key to the new node; and under the control of the new node,
  receiving the key from the key management program for the channel corresponding to the new node; and
  sending a communication to the nodes over the channel corresponding to the new node in a secure manner using the key.

8. The method of claim 7 wherein the admission policy and a plurality of key management policies are stored in a configuration file.

9. The method of claim 7 wherein the method further includes the steps, performed by the key management program for the channel corresponding to the new node, of:
  determining when the new node leaves the network;
  generating a new key responsive to the determination that the new node leaves the network; and
  distributing the new key to the nodes on the channel corresponding to the new node to supersede the key.

10. The method of claim 7 wherein the method further includes the steps, performed by the key management program for the channel corresponding to the new node, of:
  determining when an additional node corresponding to the channel joins the network;
  generating a new key responsive to the determination that the additional node joins the network; and
  distributing the new key to the nodes on the channel and the new node to supersede the key.

11. The method of claim 7 wherein the network is a private network running on a public network infrastructure.

12. A method in a data processing system for providing security in a network with a plurality of channels having nodes, the network having an access control program and each of the plurality of channels having a unique key management program, the method comprising the steps of:
  receiving by the access control program a request from a new node to join the network;
  authenticating the new node by the access control program;
  generating a key by a key management program for a channel corresponding to the new node in accordance with a key management policy of the channel and sending the key to the new node upon successful authentication of the new node, the key for use by the new node in communicating with the nodes on the channel in a secure manner, the key management program being decoupled from the access control program.

13. The method of claim 12, wherein the authentication policy and the key management policy for each channel are separately configurable.

14. The method of claim 12, wherein the network is a private network running on a public network infrastructure.

15. The method of claim 12 wherein the authenticating step further includes the step of:
  determining whether a user of the new node satisfies criteria specified in an admission policy.

16. A computer-readable medium containing instructions for controlling a data processing system to perform a method, the method for providing security in a network with a plurality of channels having nodes, the network having an access control program and each of the plurality of channels having a unique key management program, the method comprising the steps of:
  receiving by the access control program a request from a new node to join the network;
  authenticating the new node by the access control program; and
  generating a key by a key management program unique to the channel corresponding to the new node in accordance with a key management policy of the channel and sending the key to the new node upon successful authentication of the new node, the key for use by the new node in communicating with the nodes on the channel in a secure manner, the key management program unique to the channel corresponding to the new node being decoupled from the access control program.

17. The computer-readable medium of claim 16, wherein the authentication policy and the key management policy are separately configurable.

18. The computer-readable medium of claim 16, wherein the network is a private network running on a public network infrastructure.

19. A data processing system for providing security to a network with a plurality of channels having nodes, the network having an access control program and each of the plurality of channels having a key management program, the data processing system comprising:
  means for receiving a request by the access control program from a new node to join the network;
  means for authenticating the new node by the access control program; and
  means for generating a key by a key management program for a channel corresponding to the new node in accordance with a key management policy of the channel and sending the key to the new node upon successful authentication of the new node, the key for use by the new node in communicating with the nodes in the channel in a secure manner, the key management program being decoupled from the access control program.

* * * * *